United States Patent
Lunquist

(10) Patent No.: US 7,624,055 B1
(45) Date of Patent: *Nov. 24, 2009

(54) SECURE PURCHASING METHOD AND SYSTEM IN ON-LINE AUCTION

(76) Inventor: Steve Lunquist, P.O. Box 1545, Stockbridge, GA (US) 30281

( * ) Notice: Subject to any disclaimer, the term of this patent is extended or adjusted under 35 U.S.C. 154(b) by 199 days.

This patent is subject to a terminal disclaimer.

(21) Appl. No.: 11/429,622

(22) Filed: May 5, 2006

Related U.S. Application Data

(63) Continuation-in-part of application No. 11/115,881, filed on Apr. 26, 2005.

(51) Int. Cl.
*G06Q 40/00* (2006.01)

(52) U.S. Cl. .......................................... 705/35; 705/78

(58) Field of Classification Search .................. 705/26, 705/75, 76, 78, 35, 44, 40
See application file for complete search history.

(56) References Cited

U.S. PATENT DOCUMENTS

| | | | |
|---|---|---|---|
| 4,797,818 A | 1/1989 | Cotter | |
| 5,121,945 A | 6/1992 | Thomson et al. | |
| 5,758,328 A | 5/1998 | Giovannoli | |
| 5,832,457 A | 11/1998 | O'Brien et al. | |
| 5,930,764 A | 7/1999 | Melchione et al. | |
| 5,948,061 A | 9/1999 | Merriman et al. | |
| 5,966,695 A | 10/1999 | Melchione et al. | |
| 5,970,469 A | 10/1999 | Scroggie et al. | |
| 5,974,396 A | 10/1999 | Anderson et al. | |
| 5,995,942 A | 11/1999 | Smith et al. | |
| 6,026,369 A | 2/2000 | Capek | |
| 6,029,141 A | 2/2000 | Bezos et al. | |
| 6,076,069 A | 6/2000 | Laor | |
| 6,078,897 A | 6/2000 | Rubin et al. | |
| 6,085,170 A | 7/2000 | Tsukuda | |
| 6,108,639 A | 8/2000 | Walker et al. | |
| 6,119,098 A | 9/2000 | Guyot et al. | |
| 6,131,087 A | 10/2000 | Luke et al. | |
| 6,134,548 A | 10/2000 | Gottsman et al. | |
| 6,138,911 A | 10/2000 | Fredregill et al. | |

(Continued)

OTHER PUBLICATIONS

Warner, Melanie (eBay's worst nightmare, Fortune v147n10 pp. 89-94, 0015-8259, FOR, May 26, 2003).*

(Continued)

*Primary Examiner*—Ojo O Oyebisi
(74) *Attorney, Agent, or Firm*—D. Scott Hemingway; Heminway & Hansen, LLP

(57) ABSTRACT

The invention is a method for using a payment and inspection service to purchase merchandise on an online sale website. A buyer or seller can select using a payment and inspection service. The buyer pays the payment and inspection service, which holds the payment. The seller ships the item to a store where the payment and inspection service is located. The buyer goes to the store and while being monitored by an agent or employee of the service, the buyer inspects the merchandise. If the buyer accepts the item, he leaves the store with the item and the service releases the payment to the seller. If the buyer does not want to accept the item, he rejects the item, which is then repacked and returned to the seller, and the service returns the payment, less cost of shipping the item back to the seller, to the buyer.

16 Claims, 4 Drawing Sheets

U.S. PATENT DOCUMENTS

| | | |
|---|---|---|
| 6,192,131 B1 | 2/2001 | Geer, Jr. et al. |
| 6,249,722 B1 | 6/2001 | Walker et al. |
| 6,343,738 B1 | 2/2002 | Ogilvie |
| 6,381,582 B1 | 4/2002 | Walker et al. |
| 6,490,358 B1 | 12/2002 | Geer, Jr. et al. |
| 6,529,885 B1 | 3/2003 | Johnson |
| 6,547,134 B2 | 4/2003 | Oglivie |
| 6,601,033 B1 | 7/2003 | Sowinski |
| 6,754,636 B1 | 6/2004 | Walker et al. |
| 6,860,375 B2 | 3/2005 | Hallowell et al. |
| 6,865,559 B2 | 3/2005 | Dutta |
| 6,934,687 B1 | 8/2005 | Papierniak et al. |
| 6,934,692 B1 | 8/2005 | Duncan |
| 6,941,282 B1 | 9/2005 | Johnson |
| 6,950,803 B2 | 9/2005 | Tiley et al. |
| 6,980,963 B1 | 12/2005 | Hanzek |
| 7,020,623 B1 | 3/2006 | Tiley et al. |
| 7,020,625 B2 | 3/2006 | Tiley et al. |
| 2001/0037207 A1 | 11/2001 | Dejaeger |
| 2001/0042024 A1 | 11/2001 | Rogers |
| 2002/0073049 A1* | 6/2002 | Dutta ............... 705/75 |
| 2002/0161707 A1* | 10/2002 | Cole et al. ............... 705/42 |

OTHER PUBLICATIONS

Presswire (Law enforcers target internet auction fraud, 0019802342, © 1994-2000 M2 communications Ltd, Feb. 15, 2000).*

Federal Trade Commission, "Internet Auctions: A Guide for Buyers and Sellers".

Sells, Paula, Anita Ramasastry, and Andrea Sato; "Bidder Beware," Jun. 2002.

Steiner, Ina and David; "Online Escrow Fraud Hits eBay Members;" AuctionBytes.com, Oct. 25, 2002.

Richardson, Tim; "'Integrity of eBay marketplace' at risk—seller's group;" The Register (Jan. 24, 2005).

Escrow.com; Printouts from Escrow.com website dated May 16, 2006 (1999-2006).

* cited by examiner

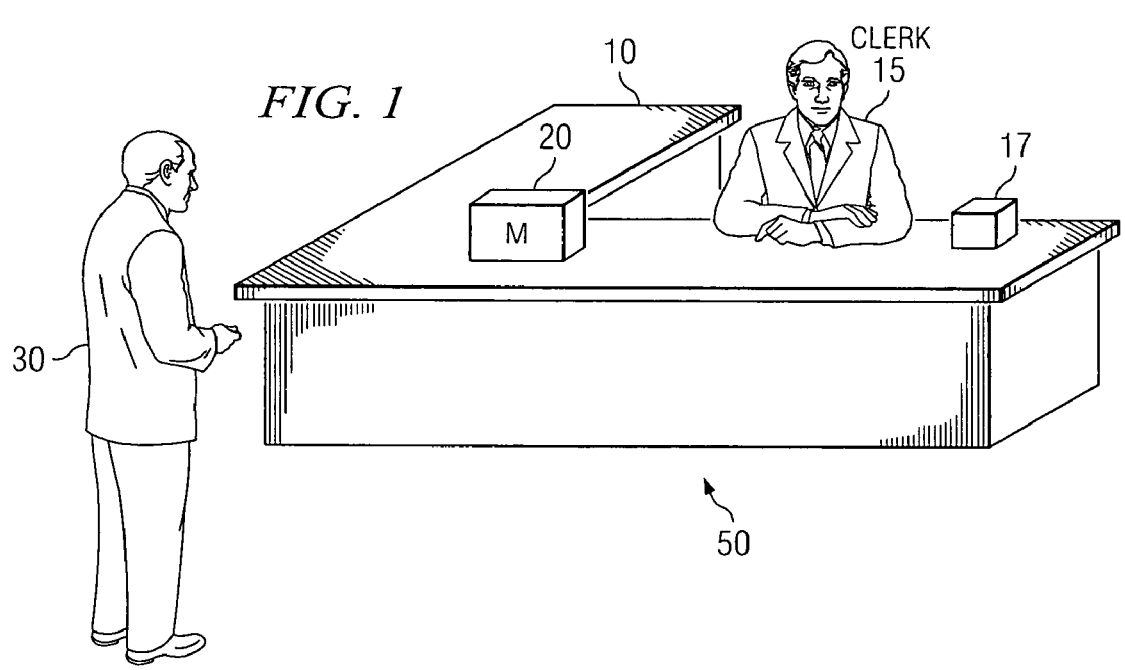
FIG. 1
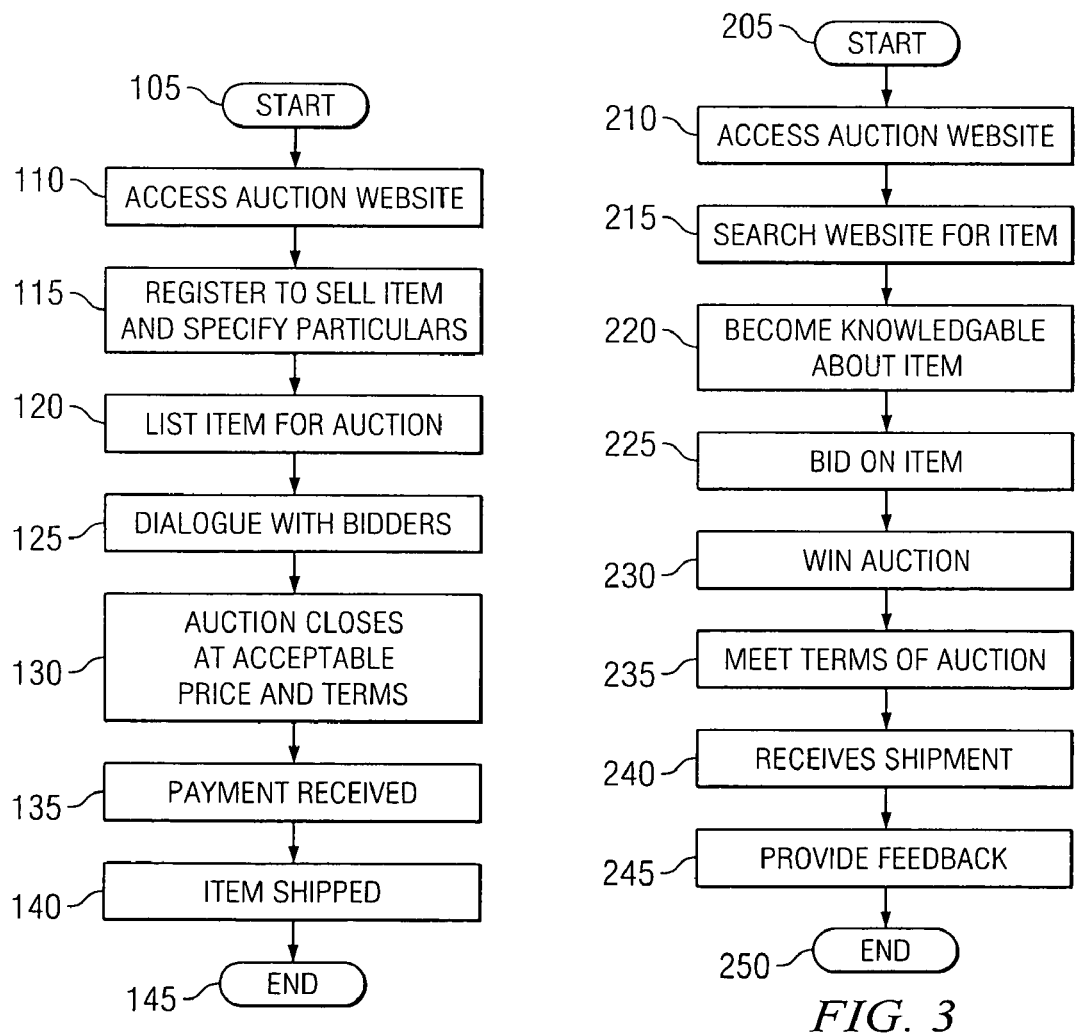
FIG. 2
(PRIOR ART)
FIG. 3
(PRIOR ART)

US 7,624,055 B1

SECURE PURCHASING METHOD AND SYSTEM IN ON-LINE AUCTION

RELATED APPLICATION DATA

This application is a continuation-in-part of U.S. application Ser. No. 11/115,881 filed on Apr. 26, 2005, and priority is claimed for this earlier filing under 35 U.S.C. § 120. Applicant further incorporates this previous filing by reference.

TECHNICAL FIELD OF THE INVENTION

A secure method for purchasing items over a computer-based sale site.

BACKGROUND OF THE INVENTION

The popularity of Internet or online auction and similar sale sites offering items for sale online has grown considerably in recent years. Users of these sites can post items for sale as either an auction selling to the highest bidder or a set sale price. Internet auctions offer a "virtual" flea market with an endless variety of merchandise available for sale accessing an Internet website using a computer. In January 2002, over 32 million Americans visited an online auction site.

This explosion in e-commerce has fueled a concurrent increase in fraud. Common frauds include late shipments by the seller beyond the agreed shipping date. Another common fraud is a completely fraudulent sale with no merchandise shipped at all. Inferior merchandise or different merchandise from that stated in the posted listing is another frequent fraud. Bogus online pay sites used by the buyer to make the payment with the pay site pocketing the payment is another fraud. Bogus escrow services have also been set up by the seller, buyer, or a third party to steal payment for the item. Fraudulent sellers that do not intend to ship the merchandise is another problem.

Other frauds frequently encountered on online auctions include bid siphoning. This occurs when a con artist lures bidders off a legitimate auction site by offering to sell the same item for less to the bidder. Shill bidding is another fraud that occurs when a seller bids on his own auction item to increase price. This has been an increasing problem on eBay and other auction sites. Bid shielding is another fraud where a fraudulent buyer submits a very high bid beyond the item's value. This discourages other bidders from placing bids, but when the bid is nearing its closing, the fraudulent buyer retracts the bid so that a confederate can bid at a much lower price and purchase the item for less than it would have legitimately brought.

Sale site operators are increasingly concerned with fraud and the potential for fraud, because fraud has an increasing impact on profits of the site providers. For example, eBay has lost significant value because of poor financial performance which is attributable in part to the fraudulent activities surrounding sales on their website. Both buyer and seller frauds occur, but it is seller fraud that most concerns users, and auction fraud is the most common Internet fraud complaint reported.

One prior art method of addressing this problem is an escrow service. In theory, a buyer uses an escrow service to pay for the goods. The goods are not shipped until the escrow services reports receipt of the funds. The escrow service receives the payment from the buyer and forwards it to the seller only after the buyer confirms satisfactory delivery. However, many escrow services are fraudulent, and the false nature of the service is rarely discovered until the defrauded seller or buyer has already suffered the loss.

Furthermore, even with legitimate escrow services, there are potential problems for the seller. For example, a buyer may return an item after using it with a claim that it has not been used. For example, a wedding or prom dress actually worn can be returned with the claim that it is not used. Books can be read or even photocopied. Products can be opened or tampered with and parts or accessories removed prior to delivery to the purchaser or prior to return to the seller for a refund. A bogus product, such as a TV chassis filled with weight ballast, can be returned as the genuine item for a refund, or an identical used and/or broken product returned for a full refund.

There is a need for a method of ensuring satisfactory delivery of items ordered online and payment for those items with little or no chance of fraud by either the seller or the buyer. A method where the item can be inspected and returned without chances of tampering, alteration, or switching would prevent most if not all of these types of frauds.

SUMMARY OF THE INVENTION

The invention is a method for securely inspecting merchandise purchased online prior to the transfer of the funds and completion of the online purchase. The buyer or seller can select use of this service. The service can be paid for by the sale site, a service charge to the buyer or the seller, or a flat rate to the service operator. After the items are purchased online, the items are sent to a storefront payment and inspection site operated by an escrow payment service. The item purchased is shipped to the inspection storefront by FedEx, UPS, DHL, mail, or other shipper. The escrow service receives the payment of the purchase price (and shipping costs) for the item. Notification of shipment and arrival at the storefront is provided to the buyer, and then the buyer goes to the storefront and inspects the purchased item within a predetermined period of time.

Once at the storefront, the buyer can examine the item purchased and decide whether to accept it or reject the merchandise. The merchandise does not leave the inspection site, and buyer has predetermined time frame to make the purchase decision. The buyer can be monitored by an in-person representative or by camera to assure nothing is done to the merchandise. If the buyer accepts the merchandise, the funds held by the escrow service are released to the seller. If the buyer rejects the merchandise, the funds held by the escrow service are refunded to the buyer, sometimes with an appropriate deduction for shipping. The rejected merchandise is returned to the seller without leaving the control of the payment and inspection service, so the seller can be assured that the item is being returned unused, unaltered, and not switched with other products.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 1 shows an embodiment of the customer window at the payment and inspection site.

FIG. 2 is a process flow schematic representation of the prior art method for a seller using an online auction website;

FIG. 3 is a process flow schematic representation of the prior art method for a buyer using an online auction website;

DESCRIPTION OF THE PREFERRED EMBODIMENTS

Figure 4:
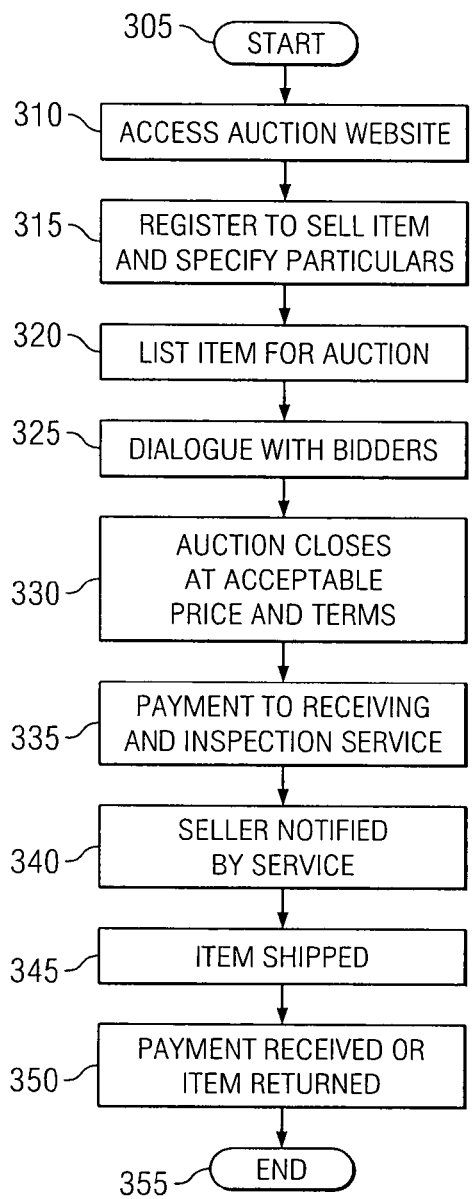
FIG. 4 is a process flow schematic representation of the method for a seller using an online auction website under the invention.
Figure 5:
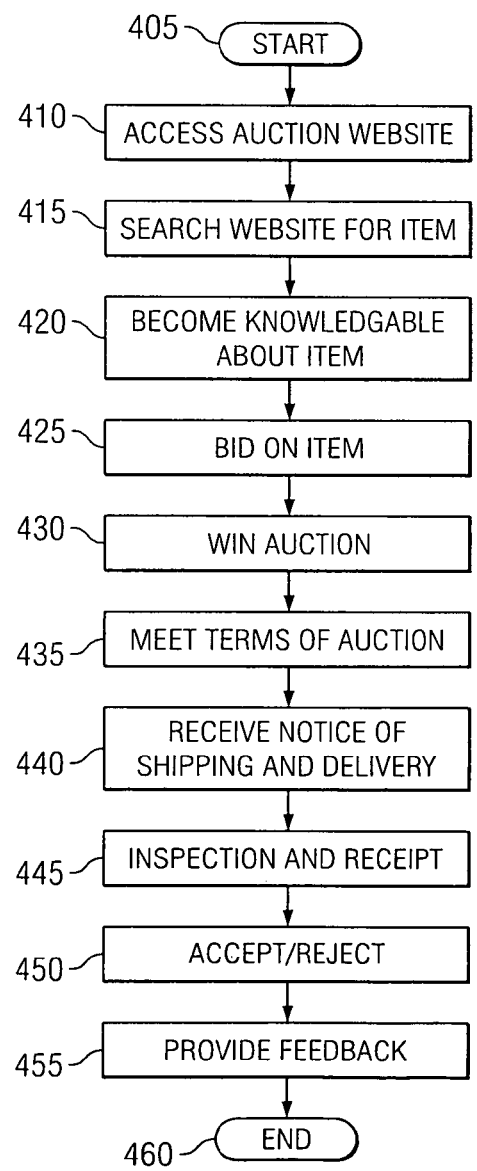
FIG. 5 is a process flow schematic representation of the method for a buyer using an online auction website under the invention.

FIG. 1 shows an embodiment for the inspection site in a store setting. The inspection site 5 can be a counter 10 located in space rented, leased or franchised to a store by the payment and inspection service, such as a FedEx Kinko's, Office Depot, Wal-Mart, or other similar retail store operation. Or the inspection site 5 can be owned by the service itself as stand-alone operation. The inspection site 5 has a counter 10 with a clerk 15. The payment and inspection service receives the shipped merchandise 20, which is made available when the buyer 30 comes to the inspection site 5.

Typically, the buyer 30 approaches the clerk 5, identifies himself to the clerk 15, and requests the shipped merchandise 20 so he can unpack and inspect the purchased item. The clerk 15 provides access to the shipped merchandise 20 at the counter 10. The buyer 30 unpacks and inspects the shipped merchandise 420 on the counter 10. While the buyer 30 unpacks and inspects the shipped merchandise 20, the clerk 15 and/or a camera surveillance system 17 monitors the buyer 30. The buyer 30 is not left unmonitored until he accepts the shipped merchandise 20. If the buyer 30 accepts the shipped merchandise 20, then the clerk 15 contacts the service so that the purchase funds are released to the seller, less any fees, such as a fee for the service. If the buyer 30 rejects the shipped merchandise 20, then the clerk 15 repacks the shipped merchandise 20 for return to the seller and contacts the service so that the purchase funds are refunded to the seller, less any amount required for return shipping or other fees, such as a fee for the service.

Although the inspection site is a store location in the preferred embodiment, numerous alternative embodiments are possible. Rather than a store, the inspection site can simply be a delivery truck with or without a built-in inspection compartment. The inspection site can even be at the buyer's home or shipping location under observation of the delivery driver or a delivery clerk, or it can be at a shippers' location, such as a UPS or FedEx shipping facility.

FIG. 2 shows an example of a process flow for listing an item on an online auction under the prior art. The process starts at step 105. In step 110, the seller accesses the auction website over the Internet. In step 115, the seller registers to sell the item and specify any particulars. At this point in the process, the seller will select the mode of payment for the item, specify the shipping procedures, describe the item, set a minimum bid, and select the duration time for the auction. In step 120, the seller lists the item for auction. Any fees are paid and the seller uploads any available pictures if desired. In step 125, the seller will engage in dialogue with bidders. Bidders can ask questions about the item or terms for payment or shipment of the item or any other concern by contacting the seller through the auction website, by email, or by phone if the seller has listed a phone number.

In step 130, the auction closes at an acceptable price and terms. The buyer's bid will exceed the minimum amount requested and according to the terms listed on the auction or as agreed to between the buyer and seller. In step 135, the seller receives the payment from the buyer under the payment choice selected, such as cash, money order, credit card, check, use of an online payment service, or use of an escrow service. If using an escrow service, the escrow service accepts and holds the payment until the buyer approves the item. Only after the buyer communicates approval is the payment tendered to the seller. In step 140, the item is shipped to the buyer. Under the prior art, shipping is direct to a buyer's specified address by a shipper, such as FedEx, UPS, DHL, or the U.S. mail. The item is delivered directly to the buyer without any intervention by a third party and only after payment for the item or tendering of the payment to an escrow service. The auction process for the seller then ends at step 45.

FIG. 3 is an example of the process flow of the prior art method for a buyer using an online auction website. The process starts at step 205. At step 210, the buyer accesses the auction website. In step 215, the buyer searches the website for the item. This may involve a focused search using a search function on the website to find specific categories of items based on a keyword or phrase, or the search may be simply browsing the website at random and finding an interesting item that attracts the attention of the buyer. In step 220, the buyer becomes knowledgeable about the item. This may consist of additional research about the item on other Internet websites, consultation with reference books or catalogs, or dialogue with the seller.

At step 225, the buyer places a bid on the item. This process may involve an automated bidding process on the website where a maximum bid amount is specified by the buyer, but the actual amount being bid at any one time depends on the amount of the next lower competing bid. The maximum bid is only reached as the bidding approaches the specified maximum up to the maximum specified. In step 230, the buyer wins the auction by bidding the highest amount that exceeds any specified minimum bid. The buyer must then meet the terms of the bid in step 235. This can include paying by the required mode (e.g. cash, credit card, money order, cashier check, etc) within a required time frame, meeting any agreed shipping options, or resolving any warranty or security issues or concerns (e.g. use of an escrow service). In step 240, the buyer receives the shipment. If an escrow service has been used, the buyer has to contact the escrow service after receiving the item so that the payment is released to the seller. In step 245, the buyer provides feedback on the auction website. Most auction websites promote leaving feedback on users of the site, often both for buyers and sellers, to provide comments on the transaction. The process ends at step 250.

FIG. 4 shows the process flow under the invention for the seller. The process begins at step 305. In step 310, the seller accesses the auction website over the Internet. In step 315, the seller registers to sell the item and specify any particulars. At this point in the process, the seller will select the mode of payment for the item, specify the shipping procedures, describe the item, set a minimum bid, select the duration time for the auction, and select secured payment and inspection option. If the payment and inspection service option is chosen, the buyer will have to comply with the service's terms and select a shipping destination. In step 320, the seller lists the item for auction. Any fees are paid and the seller uploads any available pictures and if desired. In step 325, the seller will engage in dialogue bidders. Bidders can ask questions about the item or terms for payment or shipment of the item or any other concern by contacting the seller through the auction website, by email, or by phone if the seller has listed a phone number.

In step 330, the auction closes at an acceptable price and terms. The buyer's bid will exceed the minimum amount requested and according to the terms listed on the auction or as agreed to between the buyer and seller. In step 335, the payment and inspection service receives the payment. In step 340, the seller is notified that the payment has been received and is valid with funds available and confirms the shipping address for the store performing the service. The shipping address is selected by the buyer at the time the payment is made or when making the bid. The seller ships the item to the address for the specified payment and inspection service at step 345. The payment and inspection service may be the shipper (e.g. UPS, FedEx, DHL, etc) or an independent third party. In step 350, the seller either receives the payment from the payment and inspection service or the returned item. If the buyer accepts the item, then the funds are released to the seller. If the buyer rejects the item, then the funds are returned to the buyer, less return shipping fees. The process ends at step 355.

FIG. 4 shows the process flow of the invention for a buyer using an online auction website. The process starts at step 405. At step 410, the buyer accesses the auction website over the Internet. In step 415, the buyer searches the website for the item. This may involve a focused search using a search function on the website to find specific categories of items based on a keyword or phrase, or the search may be simply browsing the website at random and finding an interesting item that attracts the attention of the buyer. In step 420, the buyer becomes knowledgeable about the item. This may consist of additional research about the item on other Internet websites, consultation with reference books or catalogs, or dialogue with the seller.

At step 425, the buyer places a bid on the item. This process may involve an automated bidding process on the website where a maximum amount is specified by the bid, but the actual amount being bid for any amount less than that maximum depends on the amount of the next lower competing bid. The maximum bid is only placed as the bidding approaches the specified maximum. In step 430, the buyer wins the auction by bidding the highest amount that exceeds any specified minimum bid. The buyer must then meet the terms of the bid in step 435. This can include paying by the required mode (e.g. cash, credit card, money order, cashier check, etc) within a required time frame, meeting any agreed shipping options, resolving any warranty or security issues or concerns (e.g. use of an escrow service or the payment and inspection service). During this step, the buyer may have the option of selecting the payment and inspection service or the service may be required by the seller. If used, at this step, the buyer selects a store with a shipping address that is provided to the seller for shipping and pays the service by an acceptable means (e.g. check, credit card, debit card, etc).

In step 440, the buyer receives notice of shipping and delivery to the payment and inspection service. The shipping service can provide the payment and inspection service at a company store, such as at a FedEx Kinko's store as one example, but shipping can be by any entity performing that service, such as FedEx, UPS, and DHL, with the inspection service performed in any convenient store location owned, operated and/or licensed by the service. In step 445, after notification, the buyer goes to the store for inspection and receipt of the item. While an employee or agent of the service is present and observing, the buyer unpacks the item to inspect while remaining in the store and being observed. In step 450, the buyer accepts or rejects the item. If the buyer accepts the item, then the service releases the payment to the seller. If the buyer rejects the item, then the service issues a credit to reimburse the buyer in an amount equal to the purchase price less shipping costs. The items is repackaged at the store and promptly returned to the seller. In step 455, the buyer provides feedback on the auction website. The process ends at step 460.

Figure 6:
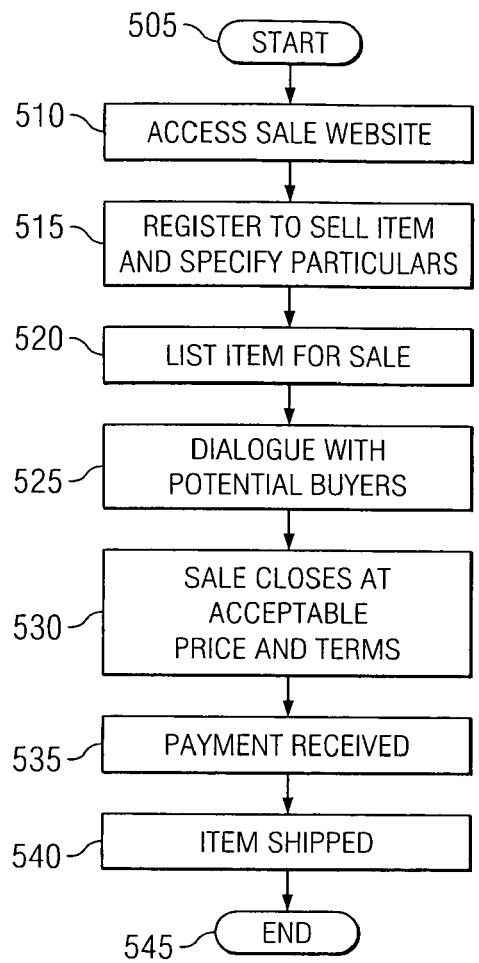
FIG. 6 is a process flow schematic representation of the prior art method for a seller using an online sale website.

FIG. 6 shows an example of a process flow for listing an item for online sale under the prior art. The process starts at step 505. In step 510, the seller accesses the sale website over the Internet. In step 515, the seller registers to sell the item and specify any particulars. At this point in the process, the seller will select the mode of payment for the item, specify the shipping procedures, describe the item, set a sale price, and select the duration time for the sale listing. In step 520, the seller lists the item for sale. Any fees are paid and the seller uploads any available pictures if desired. In step 525, the seller will engage in dialogue with potential buyers. Buyers can ask questions about the item or terms for payment or shipment of the item or any other concern by contacting the seller through the sale website, by email, or by phone if the seller has listed a phone number.

In step 530, the sale closes at an acceptable price and terms. There may be an option available for an offer below that of the listed sale price that the seller has the option of accepting. In step 535, the seller receives the payment from the buyer under the payment choice selected, such as cash, money order, credit card, check, use of an online payment service, or use of an escrow service. If using an escrow service, the escrow service accepts and holds the payment until the buyer approves the item. Only after the buyer communicates approval is the payment tendered to the seller. In step 540, the item is shipped to the buyer. Under the prior art, shipping is direct to a buyer's specified address by a shipper, such as FedEx, UPS, DHL, or the U.S. mail. The item is delivered directly to the buyer without any intervention by a third party and only after payment for the item or tendering of the payment to an escrow service. The auction process for the seller then ends at step 545.

Figure 7:
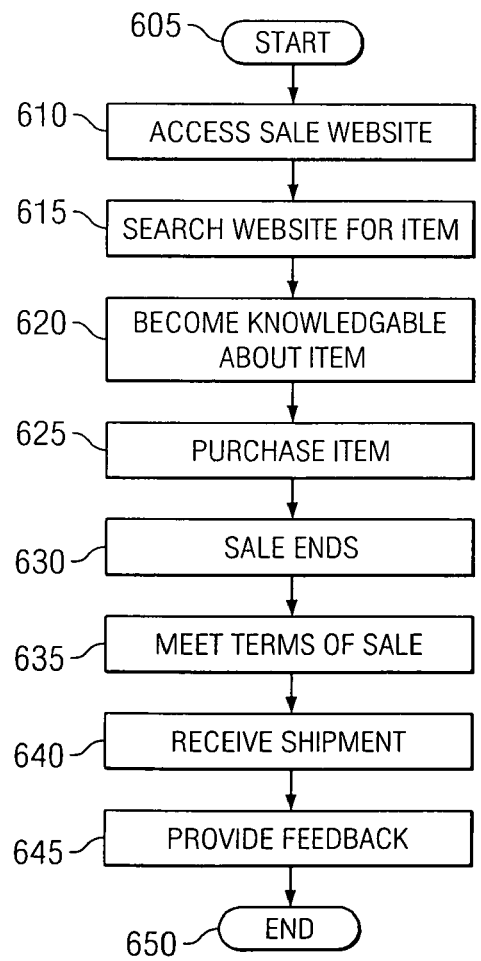
FIG. 7 is a process flow schematic representation of the prior art method for a buyer using an online sale website.

FIG. 7 is an example of the process flow of the prior art method for a buyer using an online sale website. The process starts at step 605. At step 610, the buyer accesses the sale website. In step 615, the buyer searches the website for the item. This may involve a focused search using a search function on the website to find specific categories of items based on a keyword or phrase, or the search may be simply browsing the website at random and finding an interesting item that attracts the attention of the buyer. In step 620, the buyer becomes knowledgeable about the item. This may consist of additional research about the item on other Internet websites, consultation with reference books or catalogs, or dialogue with the seller.

At step 625, the buyer purchases the item by agreeing to pay the listed price or offering to buy for less than the listed price that the seller accepts. In step 630, the sale ends with the buyer and seller agreeing to any special terms or deviation from the listed price. The buyer must then meet the terms of the sale in step 635. This can include paying by the required mode (e.g. cash, credit card, money order, cashier check, etc) within a required time frame, meeting any agreed shipping options, or resolving any warranty or security issues or concerns (e.g. use of an escrow service). In step 640, the buyer receives the shipment. If an escrow service has been used, the buyer has to contact the escrow service after receiving the item so that the payment is released to the seller. In step 645, the buyer provides feedback on the auction or sale website. Most sale websites promote leaving feedback on users of the site, often both for buyers and sellers, to provide comments on the transaction. The process ends at step 645.

Figure 8:
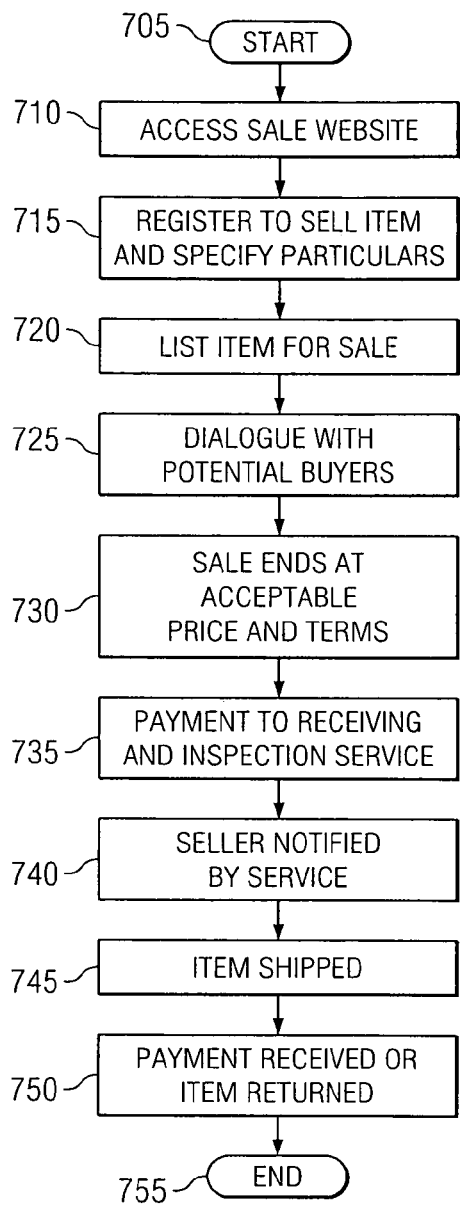
FIG. 8 is a process flow schematic representation of the method for a seller using an online sale website under the invention.

FIG. 8 shows the process flow under the invention for the seller. The process begins at step 705. In step 710, the seller accesses the sale website over the Internet. In step 715, the seller registers to sell the item and specify any particulars. At this point in the process, the seller will select the mode of payment for the item, specify the shipping procedures, describe the item, set a price, select the duration time for the sale, and select secured payment and inspection option. If the payment and inspection service option is chosen, the buyer will have to comply with the service's terms and select a shipping destination. In step 720, the seller lists the item for sale. Any fees are paid and the seller uploads any available pictures and if desired. In step 725, the seller will engage in dialogue with potential buyers. Buyers can ask questions about the item or terms for payment or shipment of the item or any other concern by contacting the seller through the sale website, by email, or by phone if the seller has listed a phone number.

In step 730, the sale ends at an acceptable price and terms. In step 735, the payment and inspection service receives the payment. In step 740, the seller is notified that the payment has been received and is valid with funds available and confirms the shipping address for the store performing the service. The shipping address is selected by the buyer at the time the payment is made or when making the bid. The seller ships the item to the address for the specified payment and inspection service at step 745. The payment and inspection service may be the shipper (e.g. UPS, FedEx, DHL, etc) or an independent third party. In step 750, the seller either receives the payment from the payment and inspection service or the returned item. If the buyer accepts the item, then the funds are released to the seller. If the buyer rejects the item, then the funds are returned to the buyer, less return shipping fees. The process ends at step 755.

Figure 9:
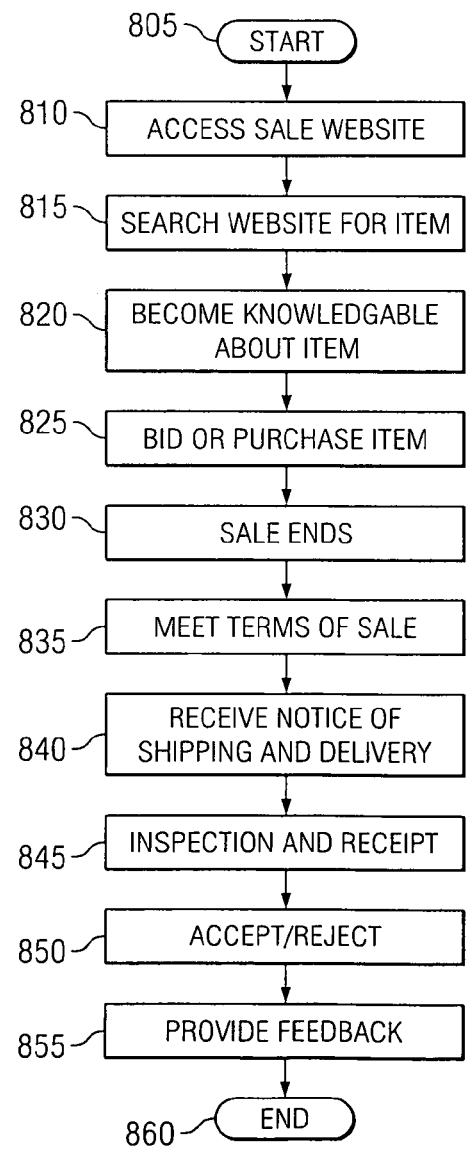
FIG. 9 is a process flow schematic representation of the method for a buyer using an online sale website under the invention

FIG. 9 shows the process flow of the invention for a buyer using an online sale website. The process starts at step 805. At step 810, the buyer accesses the sale website over the Internet. In step 815, the buyer searches the website for the item. This may involve a focused search using a search function on the website to find specific categories of items based on a keyword or phrase, or the search may be simply browsing the website at random and finding an interesting item that attracts the attention of the buyer. In step 820, the buyer becomes knowledgeable about the item. This may consist of additional research about the item on other Internet websites, consultation with reference books or catalogs, or dialogue with the seller.

At step 825, the buyer purchases the item by agreeing to pay the listed price or offering to buy for less than the listed price that the seller accepts. In step 830, the sale ends with the buyer and seller agreeing to any special terms or deviation from the listed price. The buyer must then meet the terms of the sale in step 835. This can include paying by the required mode (e.g. cash, credit card, money order, cashier check, etc) within a required time frame, meeting any agreed shipping options, resolving any warranty or security issues or concerns (e.g. use the payment and inspection service). During this step, the buyer may have the option of selecting the payment and inspection service or the service may be required by the seller. If the service is used, at this step, the buyer selects a store with a shipping address that is provided to the seller for shipping and pays the service by an acceptable means (e.g. check, credit card, debit card, etc).

In step 840, the buyer receives notice of shipping and delivery at the payment and inspection service. The shipping service can provide the payment and inspection service, such as at a FedEx Kinko's store, but shipping can be by any entity in that business, such as FedEx, UPS, and DHL, with the inspection service performed in any convenient store location with an inspection location or even at the home or other location. In step 845, after notification, the buyer goes to the store for inspection and receipt of the item. While an employee or agent of the service is present and monitoring the buyer, the buyer unpacks the item to inspect while remaining in the store and being observed. Alternatively, the inspection location can use a camera surveillance system to monitor the buyer. In step 850, the buyer accepts or rejects the item. If the buyer accepts the item, then the service releases the payment to the seller. If the buyer rejects the item, then the service issues a credit to reimburse the buyer in an amount equal to the purchase price less shipping costs. The item is repackaged at the store and promptly returned to the seller. In step 855, the buyer provides feedback on the auction website. The process ends at step 860.

While the invention has been particularly shown and described with respect to preferred embodiments, it will be readily understood that minor changes in the details of the invention may be made without departing from the spirit of the invention.

Having described the invention, I claim:

1. A method for securely purchasing an item on an on-line auction purchasing system, comprising the steps of:

after an item is offered for sale on the on-line auction purchasing system and bidding is submitted for the item offered for sale on the purchasing system, receiving an electronic message at a payment and inspection computer system from the on-line auction purchasing system, said on-line auction purchasing system message indicating that a bid has been accepted for the purchase of the offered item;

sending out an electronic message to a seller of the offered item that a payment of the bid amount for the item was received by a payment and inspection service;

sending out an electronic message to a buyer of the offered item that the purchased item was received at an inspection service site after the bid for the item was accepted;

providing the purchased item to the buyer for a monitored inspection at the inspection service site for acceptance or rejection by the buyer said payment and inspection service monitoring the buyer during the inspection, allowing the buyer to inspect the shipped item to assure its acceptability without giving the buyer an opportunity to alter or swap the shipped item; and sending a message to the seller indicating that the payment was transferred to the seller upon acceptance of the item by the buyer after said monitored inspection or the payment was not transferred to the seller if the item is rejected by the buyer after said monitored inspection.

2. The method for securely purchasing an item on an on-line auction purchasing system of claim 1, wherein the monitoring of the buyer inspecting the item is performed by observation in person by an agent or associate of the payment and inspection service.

3. The method for securely purchasing an item on an on-line auction purchasing system of claim 1, wherein the monitoring of the buyer inspecting the item is performed using a camera surveillance system.

4. The method for securely purchasing an item on an online auction purchasing system of claim 1 wherein the seller pays for the use of the payment and inspection service through a deduction from the payment funds.

5. The method for securely purchasing an item on an online auction purchasing system of claim 1 wherein the buyer pays for the use of the payment and inspection service.

6. The method for securely purchasing an item on an online auction purchasing system of claim 1 wherein the buyer has a predetermined time period to inspect the purchased item during the monitored inspection.

7. The method for securely purchasing an item on an online auction purchasing system of claim 1 wherein the item is repacked and returned to the seller if the buyer rejects the item after the monitored inspection.

8. The method for securely purchasing an item on a remote computer purchasing system of claim 6 wherein if the buyer rejects the purchased item after the monitored inspection, the payment funds, less any fees, are refunded to the buyer and the product item is repackaged and returned to the seller.

9. The method for securely purchasing an item on an online auction purchasing system of claim 6 wherein if the buyer accepts the purchased item after the monitored inspection, the payment funds, less any fees, are transferred to the seller.

10. A method for securely purchasing an item on an online auction computer system, comprising the steps of:
    receiving an electronic message at a payment and inspection computer system from the online auction computer system that a buyer has submitted a accepted bid for the purchase of an item offered on the online auction computer system;
    receiving the purchased item at an inspection location operated on behalf of a payment and inspection service as transferred from the seller;
    receiving a payment from the buyer of the item by an entity associated with the payment and inspection service;
    allowing the buyer to inspect the purchased item at the inspection location, said payment and inspection service monitoring the buyer during the inspection, allowing the buyer to inspect the shipped item to assure its acceptability without giving the buyer an opportunity to alter or swap the shipped item; and
    sending an electronic message that results in the transfer of the payment funds to the seller if the item is accepted by buyer or refunding the payment funds to the buyer upon rejection of the purchased item by the buyer.

11. The method for securely purchasing an item on an online auction computer system of claim 10, wherein the payment and inspection service deducts any fees before releasing or refunding funds by the payment and inspection service.

12. The method for securely purchasing an item on an online auction computer system of claim 10 wherein the seller selects the method of payment.

13. The method for securely purchasing an item on an online auction computer system of claim 10 wherein the seller selects the shipping procedures for the transfer of the item to the inspection location.

14. The method for securely purchasing an item on an online auction computer system of claim 10 wherein the buyer inspects the shipped item in the presence of an agent of the payment and inspection service.

15. The method for securely purchasing an item on an online auction computer system of claim 10 wherein the buyer inspects the shipped item while being monitored by a camera surveillance system.

16. The method for securely purchasing an item on an online auction computer system of claim 10 wherein the buyer inspects the item during the monitored inspection within a specified time frame.

* * * * *